(12) United States Patent
Matsumoto et al.

(10) Patent No.: US 7,852,966 B2
(45) Date of Patent: Dec. 14, 2010

(54) WIRELESS COMMUNICATION BASE STATION APPARATUS AND WIRELESS COMMUNICATION METHOD

(75) Inventors: Atsushi Matsumoto, Ishikawa (JP); Sadaki Futagi, Ishikawa (JP); Masaru Fukuoka, Ishikawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 416 days.

(21) Appl. No.: 11/915,328

(22) PCT Filed: May 24, 2006

(86) PCT No.: PCT/JP2006/310403
§ 371 (c)(1),
(2), (4) Date: Nov. 21, 2007

(87) PCT Pub. No.: WO2006/126616
PCT Pub. Date: Nov. 30, 2006

(65) Prior Publication Data
US 2009/0104908 A1    Apr. 23, 2009

(30) Foreign Application Priority Data
May 26, 2005 (JP) ............................. 2005-154014

(51) Int. Cl.
*H04L 25/49* (2006.01)
*H04W 36/00* (2009.01)
(52) U.S. Cl. ....................................... 375/296; 455/442
(58) Field of Classification Search ................ 375/260, 375/295, 296, 297, 285; 370/210, 208, 328, 370/343; 455/422.1, 436, 442
See application file for complete search history.

(56) References Cited

U.S. PATENT DOCUMENTS

| | | | |
|---|---|---|---|
| 7,327,795 B2* | 2/2008 | Oprea | 375/260 |
| 2004/0009783 A1 | 1/2004 | Miyoshi | |
| 2004/0176033 A1 | 9/2004 | Tamaki et al. | |
| 2005/0213682 A1* | 9/2005 | Han et al. | 375/267 |
| 2005/0237989 A1* | 10/2005 | Ahn et al. | 370/343 |
| 2006/0034382 A1* | 2/2006 | Ozluturk et al. | 375/267 |

FOREIGN PATENT DOCUMENTS

JP          2004159345       3/2004
WO     WO 2007/112547    * 10/2007

OTHER PUBLICATIONS

PCT International Search Report dated Aug. 15, 2006.

* cited by examiner

*Primary Examiner*—Tesfaldet Bocure
(74) *Attorney, Agent, or Firm*—Dickinson Wright PLLC

(57) ABSTRACT

A wireless communication base station apparatus that can raise the usage efficiency of the frequency resources of the whole system in a multicarrier transmission. In this apparatus, a separating part (103) separates symbols received from a modulating part (102) into symbols to be assigned to a first subcarriers group and into symbols to be assigned to a second subcarriers group. A setting part (106-1) sets the transmission power of the symbols, which are to be assigned to the first subcarriers group, to a power value as calculated by a power calculating part (105), while a setting part (106-2) sets the transmission power of the symbols, which are to be assigned to the second subcarriers group, to a power value as calculated by the power calculating part (105). Thus, the transmission power control is differently performed between the symbols to be assigned to the first subcarriers group and the symbols to be assigned to the second subcarriers group.

15 Claims, 10 Drawing Sheets

WIRELESS COMMUNICATION BASE STATION APPARATUS AND WIRELESS COMMUNICATION METHOD

TECHNICAL FIELD

The present invention relates to a wireless communication apparatus and a wireless communication method.

BACKGROUND ART

In the field of wireless communication, especially in mobile communication, a variety of information such as image and data in addition to voice is becoming transmission targets in recent years. It is anticipated that the demand for faster transmission becomes further increased in the future, and to perform high-speed transmission, a wireless transmission scheme, which utilizes limited frequency resources more effectively and achieves high transmission efficiency, has been required.

OFDM (Orthogonal Frequency Division Multiplexing) is one of wireless transmission techniques, for meeting these requirements. OFDM is one of multicarrier communication techniques, whereby data is transmitted in parallel using a large number of subcarriers, and it is known that OFDM provides high spectrum efficiency and reducing inter-symbol interference under a multipath environment and is effective to improve transmission efficiency.

On the other hand, realizing a frequency reuse (reuse of frequencies) using the same carrier frequency repeatedly, is definitely necessary for the reasons of improving high spectrum efficiency and of easy allocation of wireless communication base station apparatus, for example.

A method of frequency reuse of OFDM for dividing the entire frequency band available in systems into a plurality of bands and for using the same frequency band near the center of cells while using different frequency bands near cell edges (cell boundary) of neighboring cells (see, for example, Patent Document 1), is recently proposed.

Patent Document 1: Japanese Patent Application Laid-Open No. 2004-159345

DISCLOSURE OF INVENTION

Problems to be Solved by the Invention

However, in the methods described in Patent Document 1, only a part of the entire frequency band available in systems can be used (for example, when the entire frequency band is divided into four frequency bands, only one-half of the entire frequency band can be used in each cell.), so that, frequency reuse efficiency is not necessarily high. Thus, overall frequency resource use efficiency in the system is still susceptible to improvement.

It is therefore an object of the present invention to provide a wireless communication base station apparatus and a wireless communication method that make it possible to improve overall frequency resource use efficiency in a system, in multicarrier communications.

Means for Solving the Problem

The wireless communication base station apparatus of the present invention employs a configuration having: a power control section that performs transmission power control such that transmission power for a first subcarrier group in a plurality of subcarriers forming a multicarrier signal decreases, when received quality of a wireless communication mobile station is lower, and transmission power for second subcarrier groups different from neighboring cells in the plurality of subcarriers increases, when the received quality is lower; and a transmission section that transmits the multicarrier signal formed with the plurality of subcarriers after the transmission power control.

Advantageous Effect of the Invention

According to the present invention, it is possible to improve overall frequency resource use efficiency in a system in multicarrier communications.

BEST MODE FOR CARRYING OUT THE INVENTION

Embodiments of the present invention will be explained below in detail with reference to the accompanying drawings.

Embodiment 1

According to the present embodiment, transmission power for a plurality of subcarriers forming an OFDM symbol is controlled based on received quality of an OFDM symbol which is a multicarrier signal transmitted from a wireless communication base station apparatus (hereinafter simply "base station"), to a wireless communication mobile station apparatus (hereinafter simply "mobile station"). Moreover, a plurality of subcarriers forming an OFDM symbol is divided into a first subcarrier group for which transmission power is decreased when received quality is lower and a second subcarrier group for which transmission power is increased when received quality is lower. Furthermore, neighboring cells set second subcarrier groups using different subcarriers.

Figure 1:
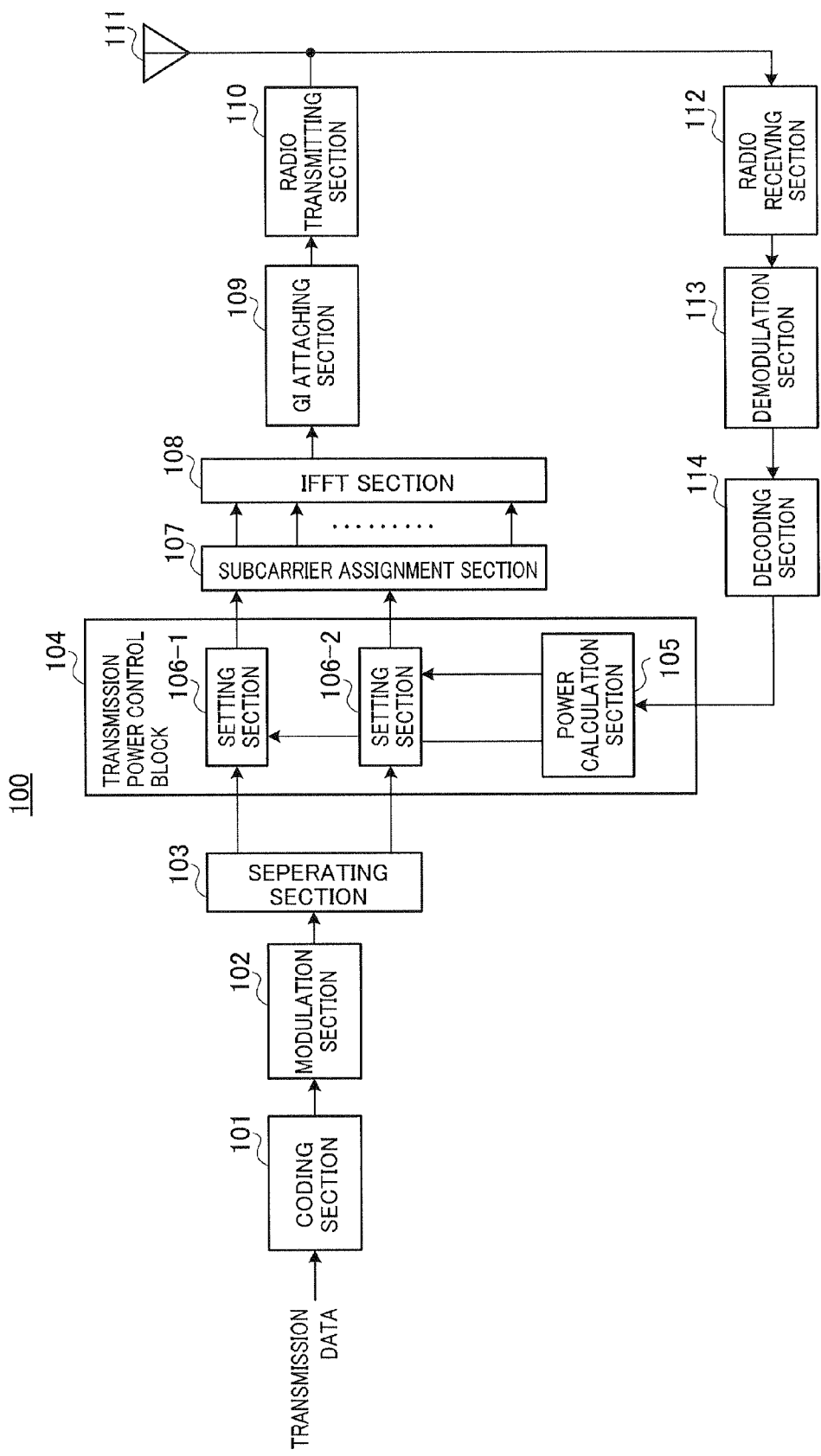
FIG. 1 is a block diagram showing a configuration of a base station apparatus according to Embodiment 1 of the present invention.

FIG. 1 shows the configuration of base station 100 according to the present embodiment.

In base station 100, coding section 101 performs coding processing on inputted transmission data (i.e. bit sequence), and modulation section 102 performs modulation processing on the transmission data after coding by modulation schemes including QPSK and 16QAM and creates symbols. Incidentally, according to the present embodiment, the coding rate in coding section 101 and the modulation scheme in modulation section 102 are determined in advance.

Separating section 103 divides symbols inputted from modulation section 102 into symbols to be assigned to a first subcarrier group and symbols to be assigned to a second subcarrier group, outputs the symbols to be assigned to the first subcarrier group to setting section 106-1 and the symbols to be assigned to the second subcarrier group to setting section 106-2.

Setting section 106-1 sets the transmission power for the symbols to be assigned to the first subcarrier group to the power value calculated in power calculation section 105. In addition, setting section 106-2 sets the transmission power for the symbols to be assigned to the second subcarrier group to the power value calculated in power calculation section 105. Moreover, transmission power control block 104 is comprised of setting sections 106-1 and 106-2 and power calculation section 105, and different power control is performed on the symbols to be assigned to the first subcarrier group and the symbols to be assigned to the second subcarrier group. Details of transmission power control will be described later. Symbols after transmission power control are outputted to subcarrier assignment section 107.

Subcarrier assignment section 107 assigns the symbols outputted from setting section 106-1 to the first subcarrier group and the symbols outputted from setting section 106-2 to the second subcarrier group, and outputs the groups to IFFT (Inverse Fast Fourier Transform) section 108. By this assignment, different transmission power control will be applied to the first subcarrier group and the second subcarrier group.

IFFT section 108 performs IFFT on the first subcarrier group and the second subcarrier group comprised of a plurality of subcarriers and acquires an OFDM symbol.

GI attaching section 109 attaches the same signal as the tail part of an OFDM symbol, to the beginning of that OFDM symbol to provide a guard interval ("GI").

Radio transmitting section 110 performs transmission processing including D/A conversion, amplification and up-conversion, on the OFDM symbol with an attachment of a GI, and transmits the result from antenna 111 to a mobile station (not shown).

Meanwhile, radio receiving section 112 receives a signal transmitted from the mobile station via antenna 111 and performs receiving processing including down-conversion and D/A conversion on this received signal.

This received signal includes received quality information reported from the mobile station. Incidentally, the mobile station is able to measure received quality from the received SNR, received SIR, received SINR, received CINR, received power, interference power, bit error rate, throughput, MCS (Modulation and Coding Scheme) that achieves a predetermined error rate, and so on. Besides, received quality information may be referred to as "CQI" (Channel Quality Indicator) and "CSI" (Channel State Information), for example. Moreover, the mobile station can measure received quality using a pilot signal transmitted from base station 100. Received quality measurement is possible using, for example, either the common pilot signal to which transmission power control is not applied or the dedicated pilot signal to which transmission power control is applied. If the dedicated pilot signal is used, the mobile station measures received quality including power variation by transmission power control in base station 100, so that accurate received quality measurement is possible. The received quality information reported from the mobile station may be used for transmitting data scheduling and link adaptation.

Demodulation section 113 performs demodulating processing on the signal after receiving processing, and decoding section 114 performs decoding on the signal after demodulation. By this means, received data is acquired, and the received quality information in the received data is inputted to power calculation section 105.

Power calculation section 105 calculates the transmission power value for the first subcarrier group and the transmission power value for the second subcarrier group individually, based on the received quality information.

Furthermore, when base station 100 is used in a TDD communication system, correlation between uplink channel characteristics and downlink channel characteristics is very high, so that base station 100 can estimate the received quality measured at a mobile station, from the received quality of a signal from the mobile station. Consequently, in a TDD communication system, base station 100 measures the received quality of the signal from the mobile station, and power calculation section 105 may calculate transmission power value based on that received quality.

Next, the transmission power control will be explained below in detail.

Figure 2A:
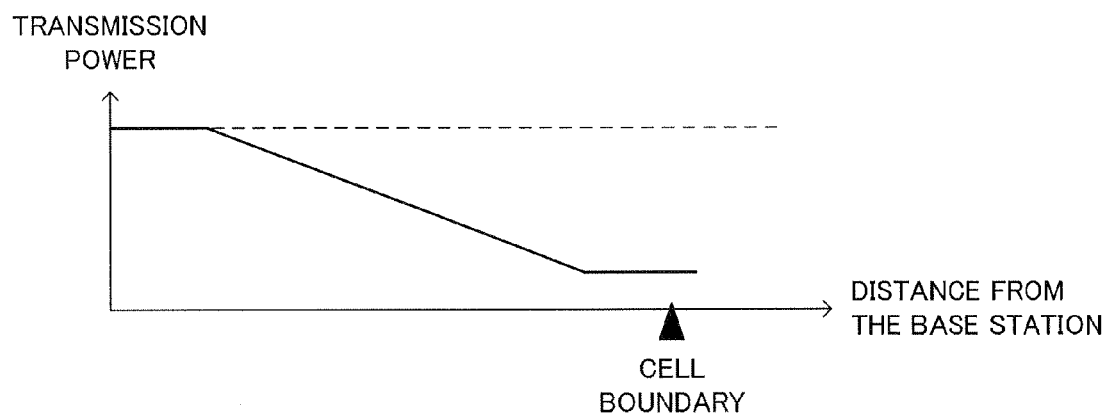
FIG. 2A illustrates transmission power control (a first subcarrier group) according to Embodiment 1 of the present invention.
Figure 2B:
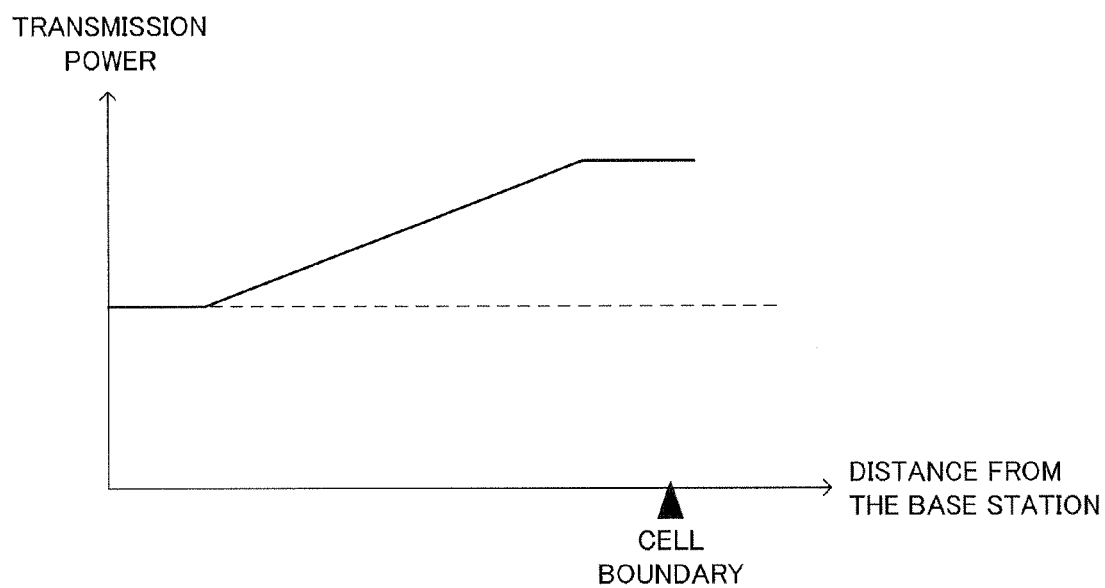
FIG. 2B illustrates transmission power control (a second subcarrier group) according to Embodiment 1 of the present invention.

Transmission power control block 104 performs transmission power control on the first subcarrier group as shown in FIG. 2A and performs transmission power control on the second subcarrier group as shown in FIG. 2B. That is, when the distance between base station 100 and a mobile station to which an OFDM symbol is transmitted, is greater, the transmission power for the first subcarrier group is decreased and the transmission power for the second subcarrier power is increased. The distance between base station 100 and the mobile station can be estimated according to the received quality in the mobile station. That is, when the distance is greater, attenuation in channels increases, and received quality is lower. Then, when the received quality reported from the mobile station is lower, transmission power control block 104 decreases the transmission power for the first subcarrier group (FIG. 2A) and increases the transmission power for the second subcarrier group (FIG. 2B). To be more specific, with reference to FIGS. 2A and 2B, power calculation section 105 calculates the transmission power values for the first subcarrier group and the second subcarrier group individually according to the received quality. Then, based on these transmission power values, setting section 106-1 sets the transmission power for symbols to be assigned to the first subcarrier group and setting section 106-2 sets the transmission power for symbols to be assigned to the second subcarrier group.

Figure 3A:
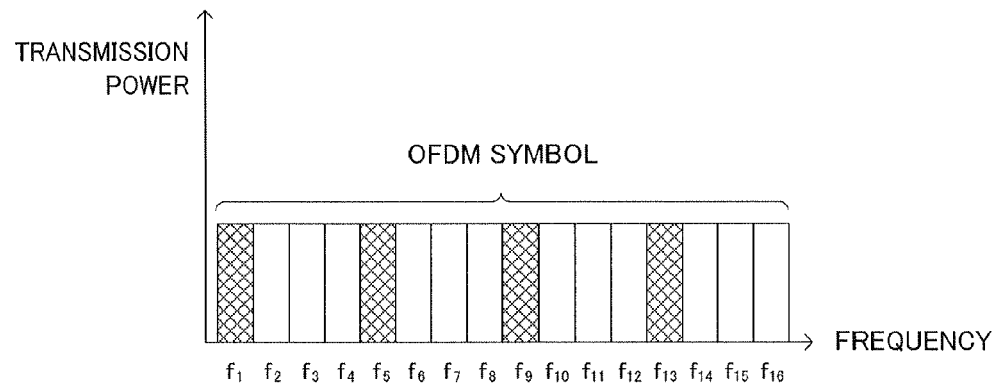
FIG. 3A illustrates transmission power control (received quality: high) according to Embodiment 1 of the present invention.
Figure 3B:
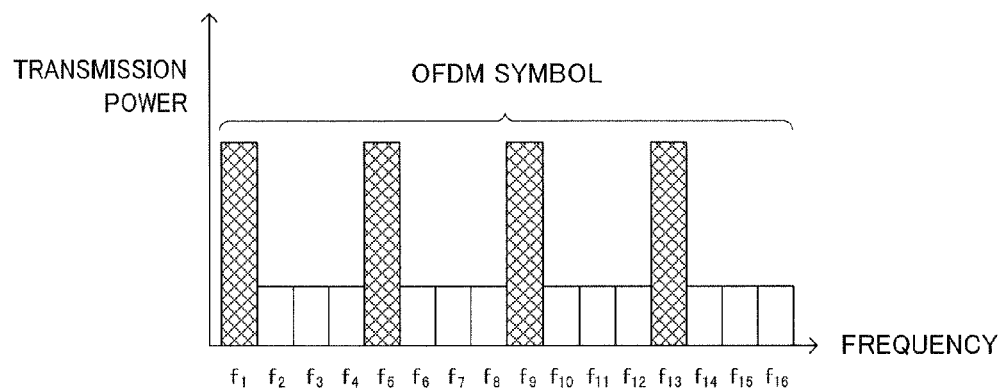
FIG. 3B illustrates transmission power control (received quality: medium) according to Embodiment 1 of the present invention.
Figure 3C:
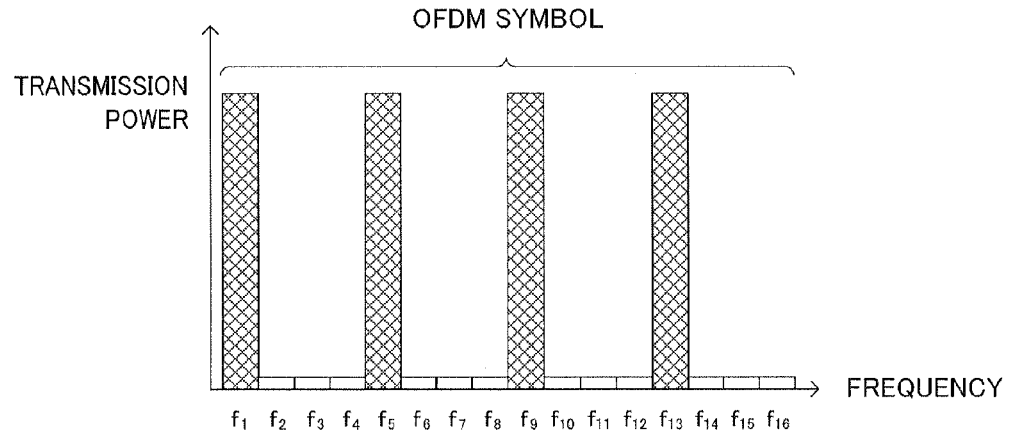
FIG. 3C illustrates transmission power control (received quality: low) according to Embodiment 1 of the present invention.

Next, referring to FIGS. 3A to 3C, transmission power control for subcarriers in an OFDM symbol will be explained in more detail. In the examples of FIGS. 3A to 3C, an OFDM symbol is formed with subcarriers $f_1$ to $f_{16}$. As the first subcarrier group, subcarriers $f_2$, $f_3$, $f_4$, $f_6$, $f_7$, $f_8$, $f_{10}$, $f_{11}$, $f_{12}$, $f_{14}$, $f_{15}$ and $f_{16}$ are set. As the second subcarrier group, subcarriers $f_1$, $f_5$, $f_9$ and $f_{13}$ are set. In addition, the location of the mobile station is farther from the base station 100 in order of FIG. 3A, FIG. 3B and FIG. 3C. That is, FIG. 3A shows the transmission power when the mobile station is located near the center of a cell and received quality is high. Further, FIG. 3C shows the transmission power when the mobile station is located near a cell edge and received quality is low. Further, FIG. 3B shows the transmission power when the mobile station is located in other places in the cell and received quality is between FIG. 3A and FIG. 3C. In this way, transmission power control block 104 performs different transmission power control on the first subcarrier group and the second subcarrier group in an OFDM symbol. That is, when the mobile station is farther from base station 100 and closer to the cell edge, transmission power control block 104 makes the transmission power for the second subcarrier group greater and improves the received quality of the second subcarrier group in the mobile station.

Moreover, transmission power control block 104, when the mobile station is located near the center of the cell, as shown in FIG. 3A, sets the transmission power for subcarriers $f_1$ to $f_{16}$ at the same level and use all of the frequency band ($f_1$ to $f_{16}$) available for use in the system in a uniform condition. That is, when the mobile station is located near the center of the cell, all subcarriers are available. Moreover, this transmission power value of the same level is the maximum transmission power value for the subcarriers in the first subcarrier group.

Figure 4:
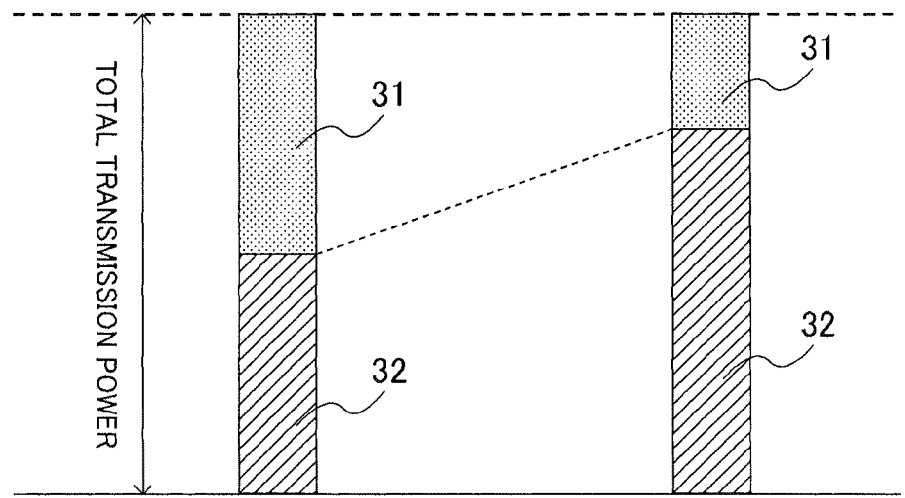
FIG. 4 illustrates transmission power control (total transmission power) according to Embodiment 1 of the present invention.

Furthermore, based on the transmission power value of the same level shown in FIG. 3A, when transmission power control block 104 increases the transmission power for the second subcarrier group, transmission power control block 104 decreases the transmission power for the first subcarrier group accordingly. By this means, as shown in FIG. 4, the sum of transmission power 31 for the first subcarrier group and transmission power 32 for the second subcarrier group (total transmission power) is fixed at all times. Consequently, when the mobile station is located near the cell edge, subcarriers in the second subcarrier group can be utilized.

Figure 5:
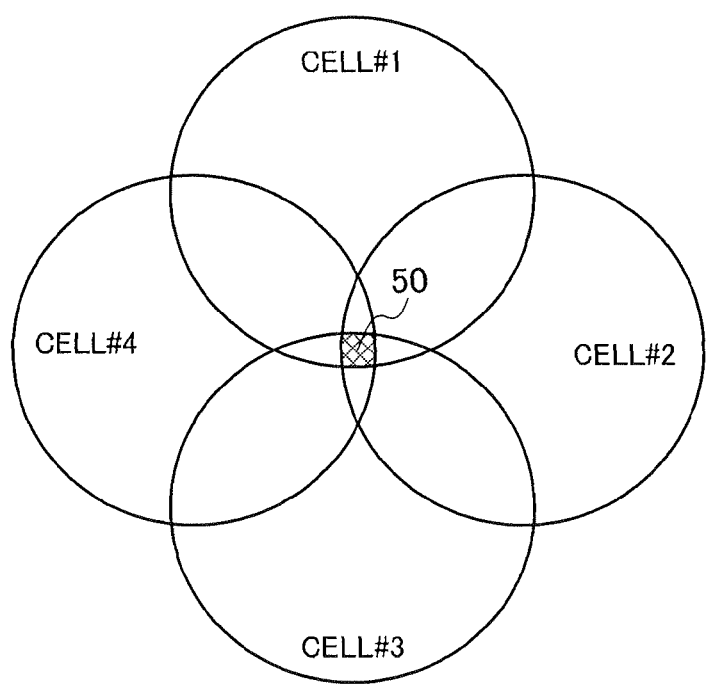
FIG. 5 shows an example of cell arrangement according to Embodiment 1 of the present invention.

Next, transmission power control in the neighboring cells will be described per cell. FIG. 5 shows an example of cell arrangement of four cells. Here, an explanation will be given below focusing on a mobile station which is engaged in communication with base station of cell #1 and which is located near cell edge 50 of cell #1.

In addition, as shown in FIGS. 6A to 6D, subcarriers $f_1$, $f_5$, $f_9$ and $f_{13}$ are set in the second subcarrier group in cell 1, subcarriers $f_2$, $f_6$, $f_{10}$ and $f_{14}$ are set in the second subcarrier group in cell 2, subcarriers $f_3$, $f_7$, $f_{11}$ and $f_{15}$ are set in the second subcarrier group in cell 3, and, subcarriers $f_4$, $f_8$, $f_{12}$ and $f_{16}$ are set in the second subcarrier group in cell 4. That is, the neighboring cells set respective second subcarrier groups using different subcarriers. A regular setting pattern of shifting the second subcarrier group by one subcarrier, per cell, is employed here. If the second subcarrier group has different subcarriers between neighboring cells, it may not necessarily be a regular setting pattern. For example, based on random patterns including PN (Pseudo Noise) patterns, each cell may set a second subcarrier group in an autonomous dispersed manner. In this way, by setting second subcarrier group in an autonomous dispersed manner, frequency locations of the second subcarrier group are not needed to predetermine in a system, so that a system design is simpler. Moreover, a plurality of consecutive subcarriers may be set in the second subcarrier group.

Incidentally, the base stations in cells 2 to 4 are engaged in communication with other mobile stations located in cells 2 to 4. In addition, all the base stations in cells 1 to 4 have the same configuration (FIG. 1).

Figure 6A:
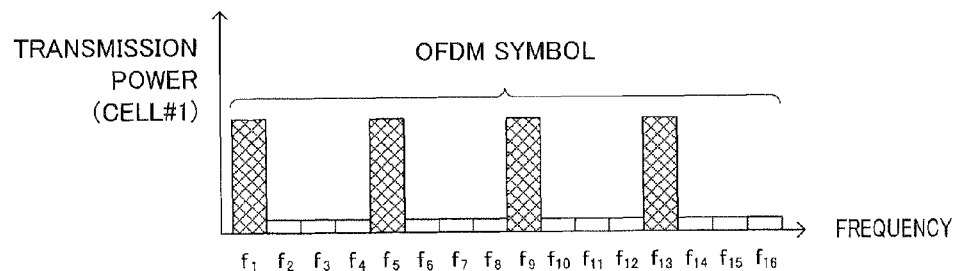
FIG. 6A illustrates transmission power control (cell #1) according to Embodiment 1 of the present invention.
Figure 6B:
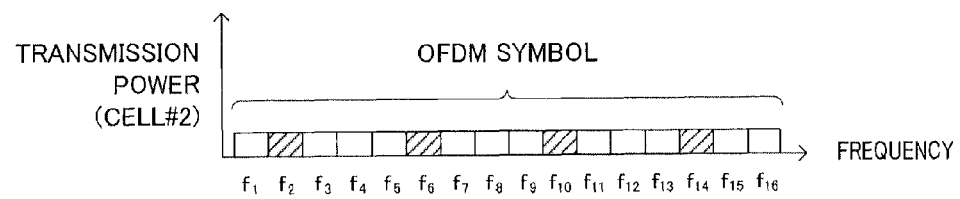
FIG. 6B illustrates transmission power control (cell #2) according to Embodiment 1 of the present invention.
Figure 6C:
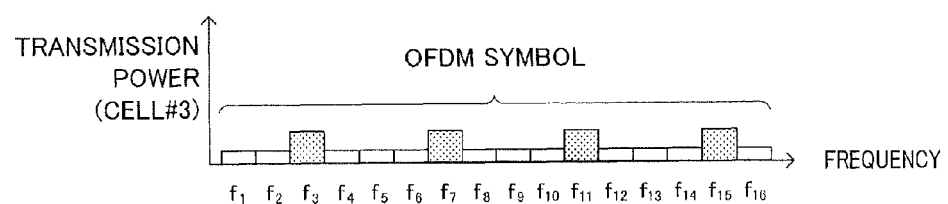
FIG. 6C illustrates transmission power control (cell #3) according to Embodiment 1 of the present invention.
Figure 6D:
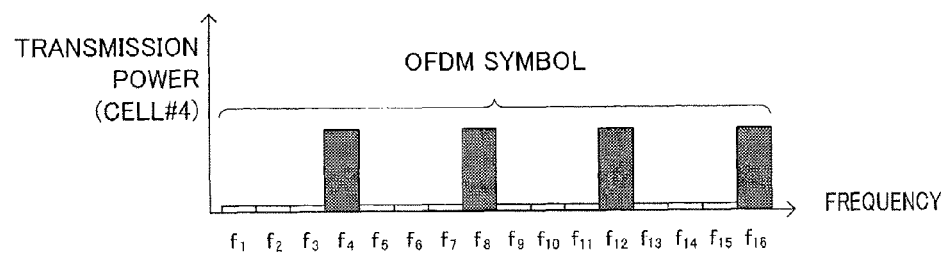
FIG. 6D illustrates transmission power control (cell #4) according to Embodiment 1 of the present invention.

In cell #1, a mobile station currently engaged in communication is located near the cell edge, so that, as shown in FIG. 6A, the base station increases the transmission power for the second subcarrier group ($f_1$, $f_5$, $f_9$ and $f_{13}$). Meanwhile, in cells #2 to #4, transmission power control shown in FIGS. 6B to 6D is performed on mobile stations currently engaged in communication in cells. For the mobile station currently engaged in communication in cell #1, the OFDM symbol shown in FIG. 6A is desired signal, and the OFDM symbols shown in FIGS. 6B to 6D are interference signals.

Figure 7:
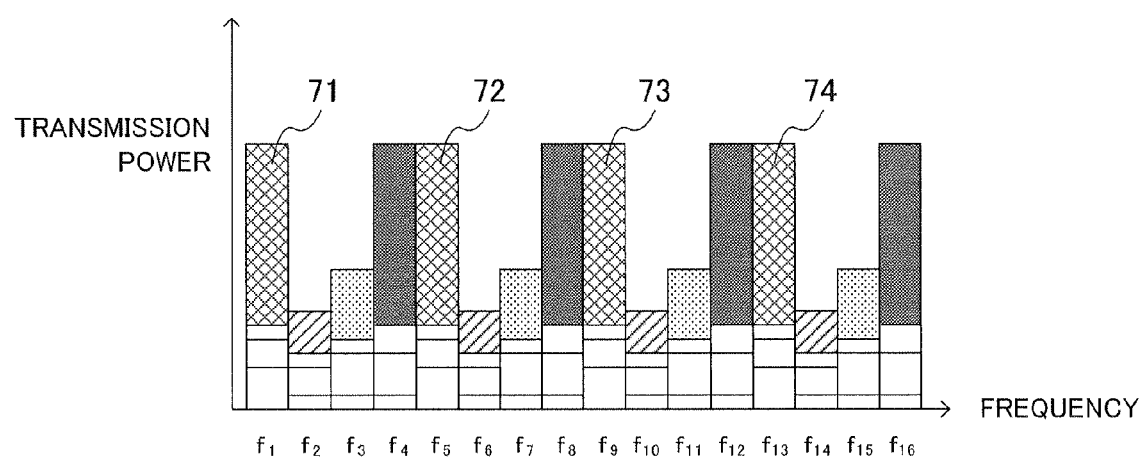
FIG. 7 shows received power of a mobile station according to Embodiment 1 of the present invention.

By this transmission power control between neighboring cells, the received power of signals which the mobile station engaged in communication at cell edge in cell #1 receives, becomes as shown in FIG. 7. The mobile station is located at cell edge, so that received power of second subcarrier group signals 71, 72, 73 and 74 increases. Moreover, different subcarriers are set as second subcarrier groups between the neighboring cells, so that, in subcarriers $f_1$, $f_5$, $f_9$ and $f_{13}$ in the second subcarrier group of cell #1, the received power of interference signals from cells #2 to #4 is significantly lower than the received power of the desired signals 71, 72, 73 and 74. Consequently, even when this mobile station is located at the cell edge, the desired signals 71, 72, 73 and 74 in the second subcarrier group fulfill the required received quality.

Incidentally, upon a handover of the mobile station between neighboring cells, the same data may be assigned to the second subcarrier group between neighboring cells. For example, in FIG. 5, upon a handover of the mobile station from cell #1 to cell #3, the data assigned to subcarriers $f_1$, $f_5$, $f_9$ and $f_{13}$ (shown in FIG. 6A) and the data assigned to subcarriers $f_3$, $f_7$, $f_{11}$ and $f_{15}$ (shown in FIG. 6C) may be the same. This makes it possible to realize a soft handover using second subcarrier groups.

In addition, upon a handover of the mobile station between neighboring cells, the same subcarriers may be set as the second subcarriers groups in the neighboring cells, and transmission diversity encoding processing including space time block coding may be performed on the transmission data. This makes it possible to reduce error rate of the received signal in the mobile station upon a soft handover.

In this way, according to the present embodiment, in each cell, all subcarriers can be utilized near the center of cells, on the other hand, at near cell edge where received quality is low, by preferentially utilizing different subcarriers between neighboring cells, inter-cell interference can be minimized between neighboring cells. Consequently, according to the present embodiment, the frequency band that each cell is able to utilize increases compared to related art, and, as a result, overall frequency resource use efficiency in the system can be improved.

Moreover, the sum of the transmission power for the first subcarrier group and the transmission power for the second subcarrier group (total transmission power) is fixed at all times, so that inter-cell interference between neighboring cells can be minimized without increasing total transmission power. That is, without increasing power consumption at the base station and load on the amplifier in the radio transmitting section, frequency resource use efficiency can be improved.

Embodiment 2

The base station according to the present embodiment changes the M-ary modulation number for data, coding rate for data, and the number of repetitions for data, according to transmission power.

Figure 8:
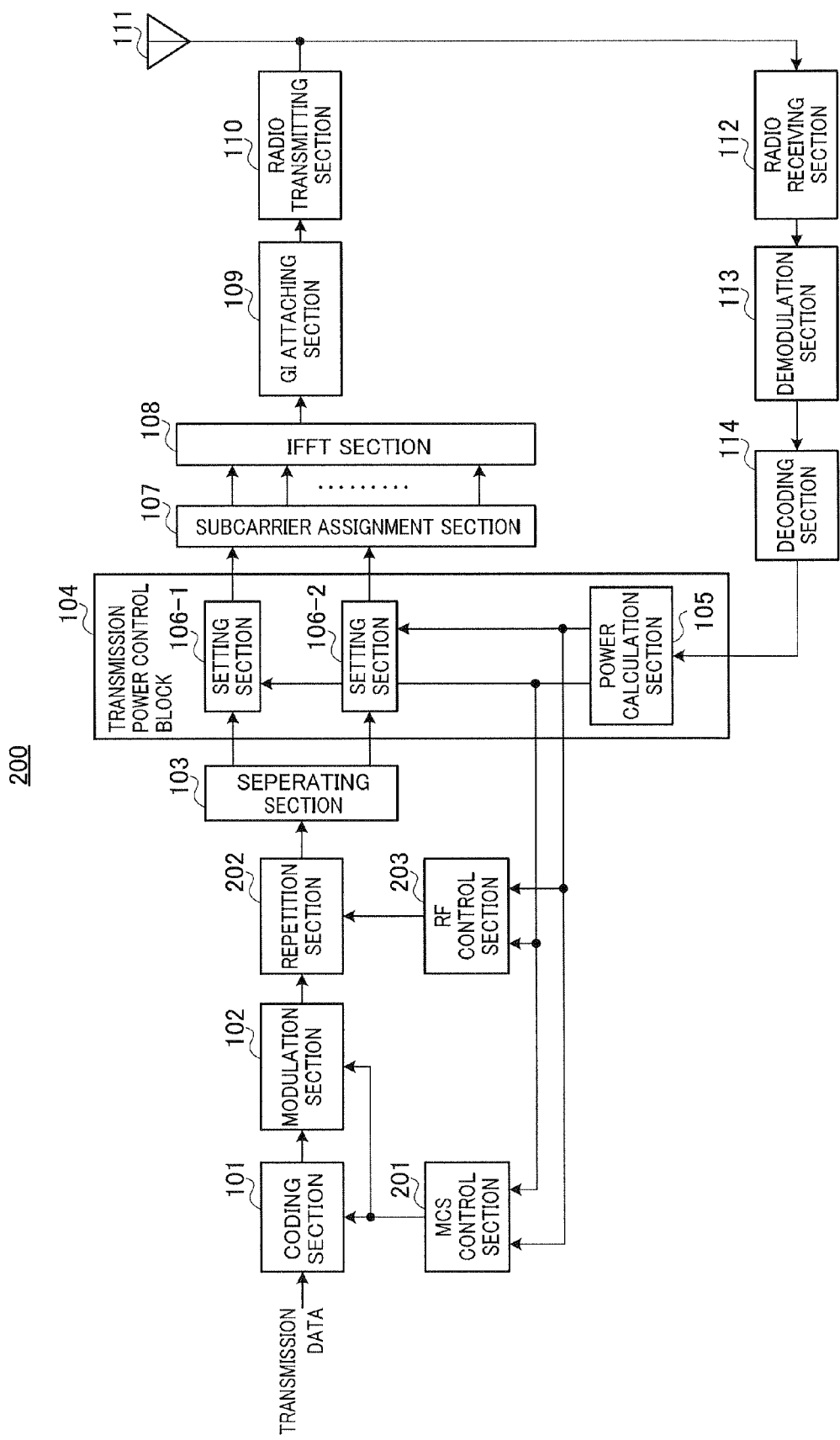
FIG. 8 is a block diagram showing a configuration of a base station apparatus according to Embodiment 2 of the present invention.

FIG. 8 shows the configuration of base station 200 according to the present embodiment. In FIG. 8, the same reference numerals are assigned to the same parts as in Embodiment 1 (FIG. 1) and explanations thereof will be omitted.

MCS control section 201 controls the coding rate in coding section 101 and the modulation scheme in modulation section 102, according to the transmission power value for the first subcarrier group and the transmission power value for the second subcarrier group inputted from power calculation section 105. To be more specific, MCS control section 201 increases the coding rate when the transmission power value is greater and decreases the coding rate when the transmission power value is lower. Moreover, MCS control section 201 increases the M-ary modulation number by changing the modulation scheme from BPSK to QPSK, from QPSK to 8PSK, from 8PSK to 16QAM, and from 16QAM to 64QAM, when the transmission power value is greater, and decreases the M-ary modulation number when the transmission power value is lower.

Repetition section 202 performs repetition on symbols outputted from modulation section 102, produces a plurality of identical symbols and outputs the symbols to separating section 103. Incidentally, this plurality of identical symbols form one unit, referred to as the "repetition unit". By combining symbols per repetition unit, in the mobile station diversity gain is acquired.

RF (Repetition Factor)control section 203 controls the number of repetitions (i.e. the number of duplicates) in repetition section 202, that is, the repetition factor, according to the transmission power value of the first subcarrier group and the transmission power value of the second subcarrier group inputted from power calculation section 105. To be more specific, RF control section 203 makes the number of repetitions greater when the transmission power value decreases and makes the number of repetitions lower when the transmission power value increases.

In this way, by controlling MCS and repetition factors, it is possible to set suitable MCS and suitable repetition factors according to transmission power for subcarriers. That is, even when a mobile station is located near a cell edge and a second subcarrier group is only available, by increasing the M-ary modulation number and coding rate and decreasing a repetition factor for the a second subcarrier group, a decrease in transmission efficiency can be prevented.

Moreover, a configuration has been explained with the present embodiment where all of the modulation scheme, the coding rate and the repetition factors are changed according to the transmission power. However, the configurations may also be applied to which two of them or any one of them is changed according to the transmission power.

Embodiment 3

A base station according to the present embodiment assigns parity bits to the first subcarrier group and systematic bits to the second subcarrier group.

Figure 9:
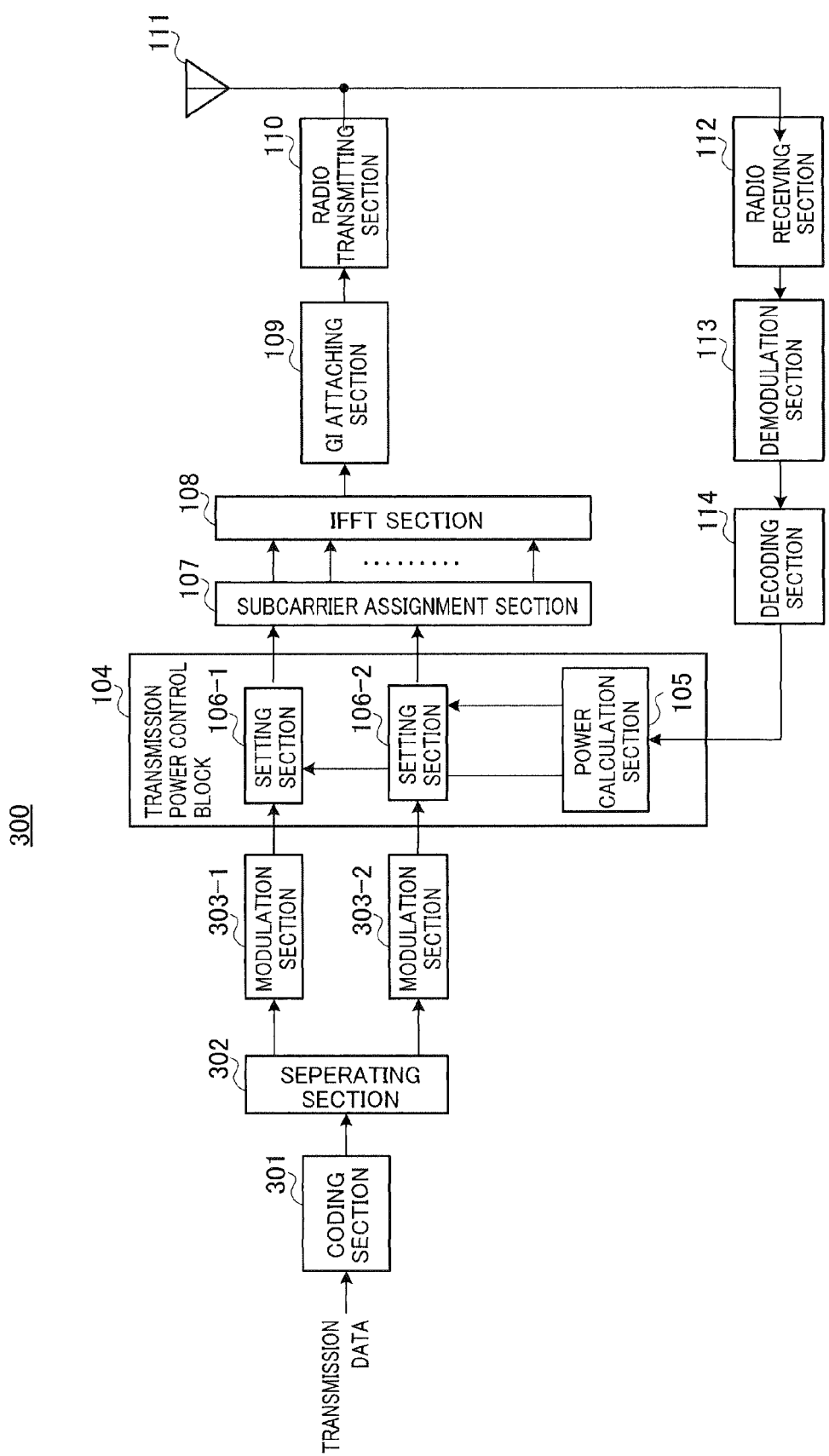
FIG. 9 is a block diagram showing a configuration of a base station apparatus according to Embodiment 3 of the present invention.

FIG. 9 shows the configuration of base station 300 according to the present embodiment. In FIG. 9, the same reference numerals are assigned to the same parts as in Embodiment 1 (FIG. 1) and explanations thereof will be omitted.

Coding section 301 performs error correction coding on transmission data (i.e. bit sequence) using systematic code such as turbo code. Coding section 301 encodes the transmission bit sequence using the systematic code, and, as a result, generates systematic bits which are transmission bits themselves and parity bits which are redundant bits.

Separating section 302 divides the bit sequence inputted from coding section 301 into the parity bits and systematic bits and outputs the parity bits to modulation section 303-1 and the systematic bits to modulation section 303-2.

Modulation section 303-1 performs modulating processing on the parity bits and generates symbols. Accordingly, symbols outputted from modulation section 303-1 are formed with parity bits alone.

Modulation section 303-2 performs modulating processing on the systematic bits and generates symbols. Accordingly, symbols outputted from modulation section 303-2 are formed with systematic bits alone.

Setting section 106-1 sets the transmission power for the symbols to be assigned to the first subcarrier group, that is, symbols formed with parity bits alone, to the power value calculated in power calculation section 105. In addition, setting section 106-2 sets the transmission power for the symbols to be assigned to the second subcarrier group, that is, symbols formed with the systematic bits alone, to the power value calculated in power calculation section 105. The symbols after the transmission power control are outputted to subcarrier assignment section 107. Incidentally, the transmission power control method is the same as in Embodiment 1 for the first subcarrier group and the second subcarrier group.

In this way, assigning parity bits to the first subcarrier group and systematic bits to the second subcarrier group makes it possible to increase transmission power for systematic bits preferentially and improve quality. Consequently, error correction capability is improved, and, as a result, throughput can be improved.

Embodiment 4

A base station according to the present embodiment assigns pilot symbols to the second subcarrier group.

Figure 10:
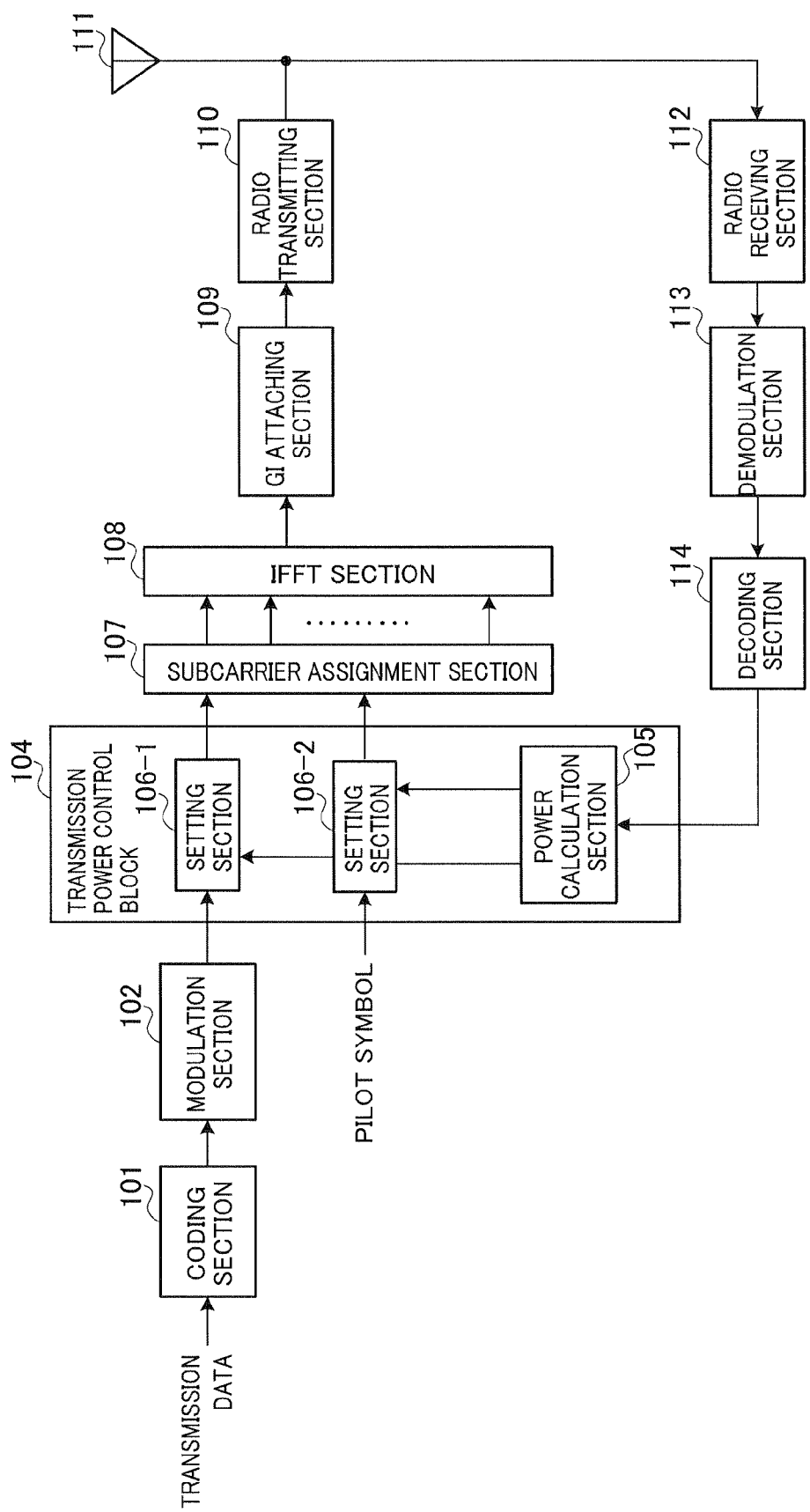
FIG. 10 is a block diagram showing a configuration of a base station apparatus according to Embodiment 4 of the present invention.

FIG. 10 shows the configuration of base station 400 according to the present embodiment. In FIG. 10, the same reference numerals are assigned to the same parts as in Embodiment 1 (FIG. 1) and explanations thereof will be omitted.

Setting section 106-2 receives as input pilot symbols. Then, setting section 106-2 sets the transmission power for the symbols to be assigned to the second subcarrier group, that is, pilot symbols, to the power value calculated in power calculation section 105.

In this way, assigning pilot symbols to the second subcarrier group makes it possible to increase the transmission power for the pilot symbols preferentially. Consequently, the accuracy of channel estimation improves in the mobile station, and, as a result, throughput can be improved.

Incidentally, control channel signals, may be assigned to the second subcarrier group instead of pilot symbols. According to 3GPP standards, control channels include the HS-SCCH (Shared Control Channel for HS-DSCH), the DCCH (Dedicated Physical Control Channel), the P-CCPCH (Primary Common Control Physical Channel), the S-CCPCH (Secondary Common Control Physical Channel), and the DPCCH (Dedicated Physical Control Channel).

In this way, assigning control channel signal which require high quality, to the second subcarrier group makes it possible to increase transmission power for the control channel signal preferentially, and to improve quality. Consequently, errors in the control channel signals can be reduced, and, as a result, throughput can be improved.

Embodiment 5

A base station according to the present embodiment assigns transmission data for a mobile station located within a certain distance from a cell edge, to the second subcarrier group, and assigns transmission data for a mobile station located within a certain distance from the base station, to the first subcarrier group. That is, in the present embodiment, data for a plurality of mobile stations are frequency-multiplexed upon one OFDM symbol.

Figure 11:
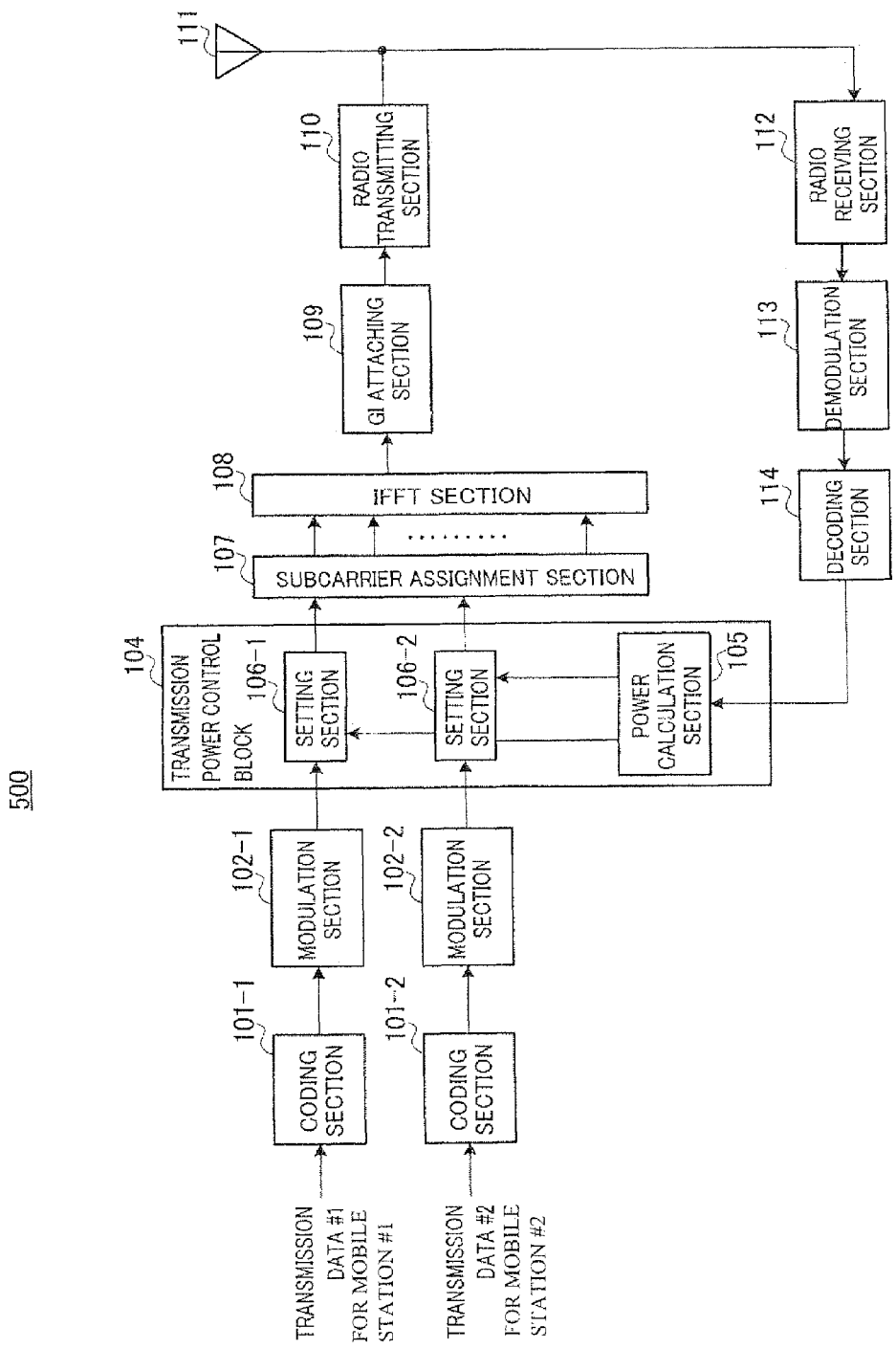
FIG. 11 is a block diagram showing a configuration of a base station apparatus according to Embodiment 5 of the present invention.

FIG. 11 shows the configuration of base station 500 according to the present embodiment. In FIG. 11, the same reference numerals are assigned to the same parts as in Embodiment 1 (FIG. 1) and explanations thereof will be omitted.

Transmission data for mobile station #1 is inputted in coding section 101-1. Mobile station #1 is located within a certain distance from the base station. Coding section 101-1 performs coding processing on inputted transmission data #1, modulation section 102-1 performs modulating processing on transmission data #1 after coding, generates symbols and outputs the symbols to setting section 106-1.

Transmission data for mobile station #2 is inputted in coding section 101-2. Mobile station #2 is located within a certain distance from the cell edge. Coding section 101-2 performs coding processing on inputted transmission data #2, modulation section 102-1 performs modulating processing on transmission data #2 after coding, generates symbols and outputs the symbols to setting section 106-2.

Setting section 106-1 sets the transmission power for symbols to be assigned to the first subcarrier group, that is, symbols for mobile station #1, to the power value calculated in power calculation section 105. On the other hand, setting section 102-1 sets the transmission power for the symbols to be assigned to the second subcarrier group, that is, the symbols for mobile station #2, to the power value calculated in power calculation section 105. Symbols after the transmission power control are outputted to subcarrier assignment section 107.

In this way, data for mobile station #1 is assigned to the first subcarrier group, and data for mobile station #2 is assigned to the second subcarrier group.

Meanwhile, radio receiving section 112 receives signals transmitted from mobile stations #1 and #2 via antenna 111 and performs receiving processing including down-conversion and D/A conversion on these received signals.

Demodulation section 113 performs demodulating processing on the signals after receiving processing and decoding section 114 performs decoding on the signals after demodulation. By this means, received data is acquired and the received quality information in received data is inputted to power calculation section 105. That is, received quality information #1 from mobile station #1 and received quality information #2 from mobile station #2 are inputted to power calculation section 105.

Power calculation section 105 calculates the transmission power value for the first subcarrier group and transmission power value for the second subcarrier group based on the received quality information.

Incidentally, the transmission power control method of the first subcarrier group and a second subcarrier group is the same as Embodiment 1.

By this means, when data for a plurality of mobile stations are frequency-multiplexed upon one OFDM symbol, it is possible that suitable subcarriers assignment and transmission power control according to the location of the mobile station, that is, the distance from the base station, so that overall system throughput can be increased.

Incidentally, the location of each mobile station can be learned from the received quality information reported from the mobile station. That is, the received quality information is compared with predetermined threshold value #1, and when the received quality is higher than threshold value #1, the mobile station that has reported the received quality information is determined to be mobile station #1, which is located within a certain distance from base station 500 (that is, near the center of the cell). In addition, the received quality information is compared with predetermined threshold value #2 that is lower than threshold value #1, and, when the received quality information is lower than threshold value #2, base station 500 determines that the mobile station that has reported the received information is mobile station #2, which is located within a certain distance from the cell edge (that is, near the cell edge).

Furthermore, although cases have been described with the above embodiments where the present invention is applied to cells, the present invention may also be applied in sectors.

Moreover, in the above embodiments, the transmission scheme of the signal that a mobile station transmits in uplink is not specifically limited. A mobile station can use any transmission schemes, for example, single-carrier scheme, OFDM scheme and CDMA scheme.

Moreover, the base station apparatus may be referred to as "Node-B", the mobile station may be referred to as "UE", and the subcarrier may be referred to as "tone". In addition, a subcarrier group may be referred to as "resource block" and "resource unit".

Moreover, although with the above embodiments cases have been described where the present invention is configured by hardware, the present invention may be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-154014, filed on May 26, 2005, the entire content of which is expressly incorporated by reference herein.

INDUSTRIAL APPLICABILITY

The present invention is applicable, for example, to mobile communication systems.

The invention claimed is:

1. A wireless communication apparatus, comprising:
   a power control section that performs transmission power control such that transmission power for a first subcarrier group in a plurality of subcarriers forming a multicarrier signal decreases and transmission power for a second subcarrier group in the plurality of subcarriers increases; and
   a transmission section that transmits the multicarrier signal formed with the plurality of subcarriers after the transmission power control, wherein:
   the power control section performs the transmission power control such that the transmission power for the first subcarrier group decreases in accordance with decreasing received quality and the transmission power for the second subcarrier group increases in accordance with the decreasing received quality.

2. The wireless communication apparatus according to claim 1, wherein the power control section performs the transmission power control such that transmission power for the second subcarrier group different between neighboring cells or between neighboring sectors increases.

3. The wireless communication apparatus according to claim 1, wherein the power control section fixes a sum total of the transmission power for the first subcarrier group and the transmission power for the second subcarrier group.

4. The wireless communication apparatus according to claim 1, further comprising a modulation and coding scheme control section that increases an M ary modulation number for data to be assigned to the first subcarrier group or the second subcarrier group, when the power control section increases the transmission power for the first subcarrier group or the second subcarrier group.

5. The wireless communication apparatus according to claim 1, further comprising a modulation and coding scheme control section that increases a coding rate for data to be assigned to the first subcarrier group or the second subcarrier group, when the power control section increases the transmission power for the first subcarrier group or the second subcarrier group.

6. The wireless communication apparatus according to claim 1, further comprising a repetition factor control section that increases a number of repetitions for data to be assigned to the first subcarrier group or the second subcarrier group, when the transmission power control section decreases the transmission power for the first subcarrier group or the second subcarrier group.

7. The wireless communication apparatus according to claim 1, further comprising:
   a coding section that encodes transmission data and generates systematic bits and parity bits; and
   an assignment section that assigns the systematic bits to the second subcarrier group and the parity bits to the first subcarrier group.

8. The wireless communication apparatus according to claim 1, further comprising an assignment section that assigns a pilot symbol to the second subcarrier group.

9. The wireless communication apparatus according to claim 1, further comprising an assignment section that assigns a control channel signal to the second subcarrier group.

10. The wireless communication apparatus according to claim 1, further comprising an assignment section that assigns transmission data for a communicating party located within a certain distance from a cell edge to the second subcarrier group, and assigns transmission data for a communicating party located within a certain distance from the wireless communication apparatus to the first subcarrier group.

11. A wireless communication base station apparatus comprising the wireless communication apparatus according to claim 1.

12. A wireless communication method comprising decreasing transmission power for a first subcarrier group in a plurality of subcarriers forming a multicarrier signal and increasing transmission power for a second subcarrier group in the plurality of subcarriers, wherein:
   the transmission tower for the first subcarrier group is decreased in accordance with decreasing received quality and the transmission power for the second subcarrier group is increased in accordance with the decreasing received quality.

13. The wireless communication method according to claim 12, wherein transmission power for the second subcarrier groups different between neighboring cells or between neighboring sectors is increased.

14. The wireless communication method according to claim 12, wherein the second subcarrier group is set in cells or in sectors in random patterns.

15. The wireless communication method according to claim 12, wherein, upon a handover of a wireless communication mobile station apparatus between neighboring cells or between neighboring sectors, same data is assigned to the second subcarrier group between the neighboring cells or between the neighboring sectors.

* * * * *

UNITED STATES PATENT AND TRADEMARK OFFICE
CERTIFICATE OF CORRECTION

| | | |
|---|---|---|
| PATENT NO. | : 7,852,966 B2 | |
| APPLICATION NO. | : 11/915328 | |
| DATED | : December 14, 2010 | |
| INVENTOR(S) | : Atsushi Matsumoto et al. | |

It is certified that error appears in the above-identified patent and that said Letters Patent is hereby corrected as shown below:

Claim 12, column 12, line 31, incorrectly reads:
"the transmission tower for the first subcarrier group is"
and should read:
"the transmission power for the first subcarrier group is"

Signed and Sealed this
Fourteenth Day of February, 2012

David J. Kappos
*Director of the United States Patent and Trademark Office*